United States Patent
Xu et al.

(10) Patent No.: US 10,518,773 B2
(45) Date of Patent: Dec. 31, 2019

(54) VEHICLE AND VEHICLE LAUNCH METHOD

(71) Applicant: FORD GLOBAL TECHNOLOGIES, LLC, Dearborn, MI (US)

(72) Inventors: Yang Xu, Dearborn, MI (US); Zhengyu Dai, Canton, MI (US); Guopeng Hu, Northville, MI (US); Sathish Atluri, Novi, MI (US); David Peterson, Westland, MI (US); Qi Wang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 251 days.

(21) Appl. No.: 15/864,564

(22) Filed: Jan. 8, 2018

(65) Prior Publication Data

US 2019/0210603 A1 Jul. 11, 2019

(51) Int. Cl.
*B60W 30/18* (2012.01)
*B60W 10/02* (2006.01)
*B60W 10/184* (2012.01)

(52) U.S. Cl.
CPC ...... *B60W 30/18027* (2013.01); *B60W 10/02* (2013.01); *B60W 10/184* (2013.01); *B60W 30/18118* (2013.01); *B60W 2510/0208* (2013.01); *B60W 2510/0275* (2013.01); *B60W 2510/0657* (2013.01); *B60W 2510/1025* (2013.01); *B60W 2520/30* (2013.01);
(Continued)

(58) Field of Classification Search
CPC ........... B60W 30/18; B60W 30/18027; B60W 30/18118; B60W 10/02; B60W 10/184; B60W 2410/0208; B60W 2510/0275; B60W 2510/0657; B60W 2510/1025; B60W 2520/30; B60W 2550/142; B60W 2710/021; B60W 2710/18
See application file for complete search history.

(56) References Cited

U.S. PATENT DOCUMENTS 6,321,144 B1   11/2001  Crombez
8,239,107 B2    8/2012  Mair
(Continued)

FOREIGN PATENT DOCUMENTS

CN   105752073 A   7/2016
KR   101745266 B1  6/2017

*Primary Examiner* — Huan Le
(74) *Attorney, Agent, or Firm* — David Kelley; Brooks Kushman P.C.

(57) ABSTRACT

A vehicle includes a transmission, friction brakes, and a controller. The transmission has a clutch that is configured to transfer torque from an input of the transmission to a drive wheel. The controller is programmed to, in response to application of the friction brakes resulting in a stationary position of the vehicle, disengage the clutch to establish a neutral condition of the transmission. The controller is also programmed to, in response to a command to launch the vehicle while the transmission is in the neutral condition, engage the clutch. The controller is further programmed to, in response to an estimated wheel torque exceeding a rollback threshold during the clutch engagement, release the friction brakes. The wheel torque is based on an estimated clutch torque which is based on a clutch pressure and a transmission input torque.

20 Claims, 3 Drawing Sheets

(52) U.S. Cl.
CPC . *B60W 2550/142* (2013.01); *B60W 2710/021* (2013.01); *B60W 2710/18* (2013.01)

(56) References Cited

U.S. PATENT DOCUMENTS

| | | | | |
|---|---|---|---|---|
| 2011/0169323 A1* | 7/2011 | Tseng | ............ | B60W 10/06 303/191 |
| 2013/0297161 A1* | 11/2013 | Gibson | ............ | B60W 20/00 701/54 |
| 2014/0106927 A1* | 4/2014 | Gibson | ............ | F16D 28/00 477/5 |
| 2015/0266479 A1* | 9/2015 | Blakeway | ............ | B60W 10/06 477/92 |

* cited by examiner

VEHICLE AND VEHICLE LAUNCH METHOD

TECHNICAL FIELD

The present disclosure relates to vehicles and systems for controlling the powertrains of vehicles.

BACKGROUND

A vehicle transmission may be transitioned to a neutral condition by disengaging one of a plurality of clutches within the transmission.

SUMMARY

A vehicle includes a transmission, friction brakes, and a controller. The transmission has a clutch that is configured to transfer torque to a drive wheel. The controller is programmed to, in response to a command to launch the vehicle, engage the clutch. The controller is also programmed to, in response to an estimated clutch torque exceeding a rollback threshold during the clutch engagement, release the brakes. The estimated clutch torque is based on a clutch pressure and a transmission input torque.

A vehicle includes a transmission, friction brakes, and a controller. The transmission has a clutch that is configured to transfer torque from an input of the transmission to a drive wheel. The controller is programmed to, in response to application of the friction brakes resulting in a stationary position of the vehicle, disengage the clutch to establish a neutral condition of the transmission. The controller is also programmed to, in response to a command to launch the vehicle while the transmission is in the neutral condition, engage the clutch. The controller is further programmed to, in response to an estimated wheel torque exceeding a rollback threshold during the clutch engagement, release the friction brakes. The wheel torque is based on an estimated clutch torque, which is based on a clutch pressure and a transmission input torque.

A method includes engaging a clutch to transfer torque from a vehicle transmission input to a vehicle drive wheel in response to a vehicle launch command and releasing vehicle friction brakes in response to wheel torque exceeding a rollback threshold during the clutch engagement. The wheel torque is based on an estimated clutch torque which is based on a clutch pressure and a transmission input torque.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
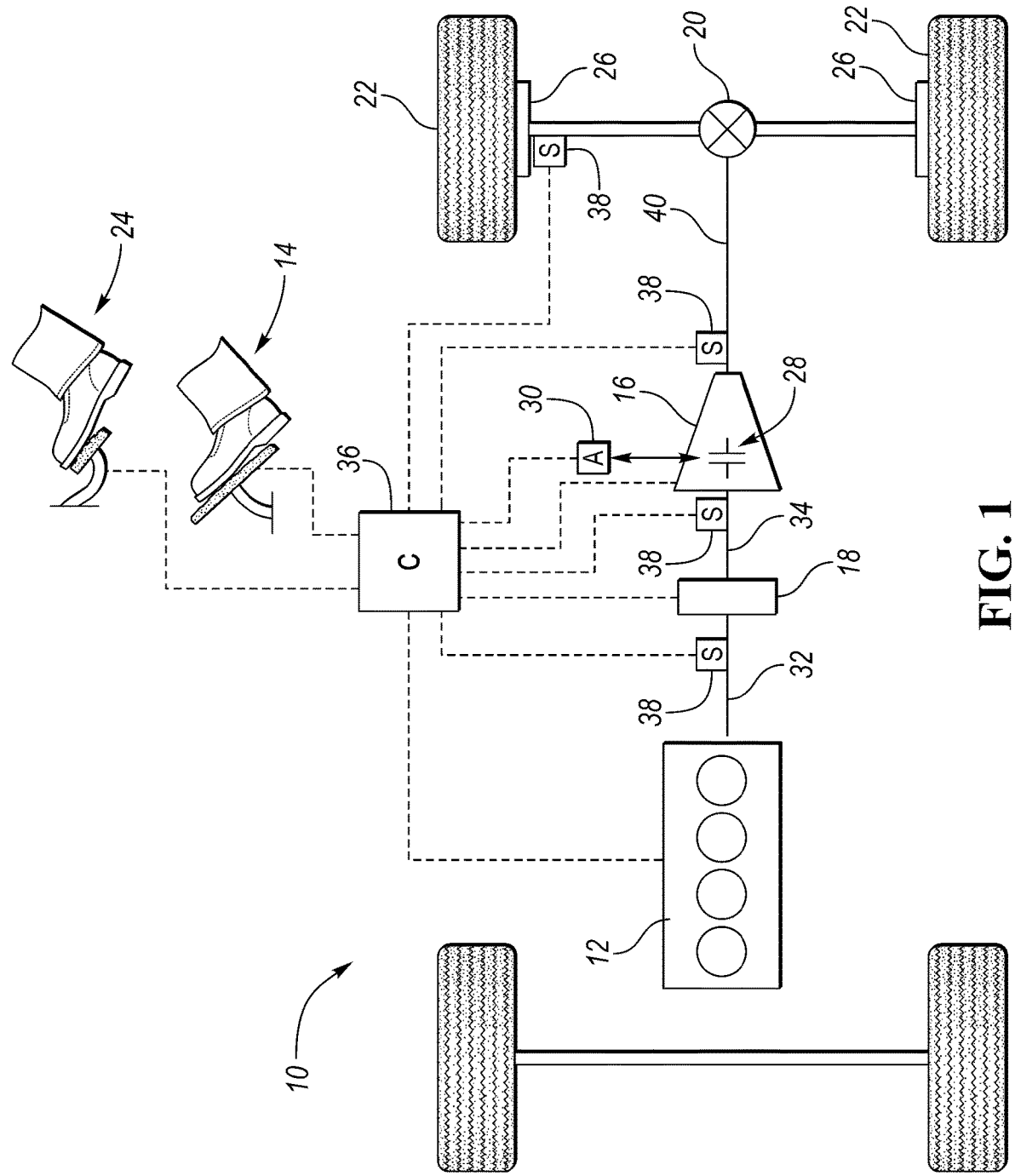
FIG. 1 is a schematic illustration of a representative vehicle.

Referring to FIG. 1, a representative vehicle 10 is illustrated. The vehicle 10 includes a powertrain. The powertrain may include a power generator that is configured to generate torque and power within the powertrain, such as an internal combustion engine 12. The vehicle operator may request a desired torque and/or power output of the engine 12 by depressing an accelerator pedal 14. The powertrain may further include a gearbox 16, a transmission input device 18 that transfers torque and/or power from an output of the engine 12 to an input of the gearbox 16, a differential 20, drive wheels 22, and various other components such as gears, universal joints, and/or driveshafts. The vehicle may also include a brake pedal 24 that is configured to engage friction brakes 26 when applied to slow the vehicle 10 or prevent the wheels 22 from turning if the vehicle 10 is stationary. Power and/or torque is transferred from the input of the gearbox 16 to the drive wheels 22 via the differential 20 and other intermediate components (e.g., gears, driveshafts, half shafts, universal joints, etc.).

The gearbox 16 may be a multi-ratio transmission that includes a plurality of clutches that engage and disengage rotating elements (e.g., gears, shaft, etc.) to provide multiple gear ratios between the input and an output of the gearbox 16. An example clutch 28 is illustrated within the gearbox 16. The example clutch may be representative of one or more of the plurality of clutches within the gearbox 16. An actuator 30 is configured to engage/disengage the clutch 28. The actuator 30 may be a valve that opens and closes to increase/decrease hydraulic pressure acting on a piston that engages/disengages the clutch 28. The actuator 30 may be representative multiple actuators that are each configured to engage/disengage one of the plurality of clutches within the gearbox 16.

The transmission input device 18 may be a torque converter that includes an impeller that is affixed to the engine output 32 (i.e., the crankshaft of the engine 12), a stator, and a turbine that is affixed to transmission input 34 (i.e., an input shaft to the gearbox 16). Alternatively, transmission input device 18 may be one or more clutches that connects the engine output 32 to one or more transmission inputs. For example, in an automated manual transmission (AMT), the transmission input device 18 may include a single clutch that connects the crankshaft of the engine 12 to a single input shaft to the gearbox 16. As an additional example, in a dual clutch transmission (DCT), the transmission input device 18 may include two clutches where each clutch is configured to connect the crankshaft of the engine 12 to one of a pair of input shafts to the gearbox 16.

A controller 36 may be in communication with and configured to control various subsystems of the vehicle 10 including the engine 12, the gearbox 16 (e.g., to engage/ disengage the actuators 30 in order engage/disengage the clutches 28 to shift the gearbox 16 between gears), the transmission input device 18 (e.g., an actuator to engage/ disengage clutches if the transmission input device 18 includes clutches), and other various vehicles subsystems based on various states or conditions of the vehicle 10. The vehicle 10 may include various sensors that communicate the various states or conditions of the vehicle 10 to the controller 36. For example, one or more sensors 38 may communicate the power, torque, and/or speed of the engine output 32 (i.e., the crankshaft of the engine 12), the transmission input 34 (e.g., a turbine of the torque converter), a transmission output 40 (e.g., the shaft between the gearbox 16 and the differential 20), and/or the wheels 22. It should be noted that the engine output 32 may be also be considered an input to the gearbox 16 in the event that the engine output 32 and transmission input 34 are coupled to each other and operate as a single rotating element. For example, the engine output 32 and transmission input 34 may be coupled to each other and operate as a single rotating element under a scenario where the transmission input device 18 includes a clutch, that the couples the engine output 32 to transmission input 34, which is in a closed state.

While illustrated as one controller, the controller 36 may be part of a larger control system and may be controlled by various other controllers throughout the vehicle 10, such as a vehicle system controller (VSC). It should therefore be understood that the controller 36 and one or more other controllers can collectively be referred to as a "controller" that controls various actuators in response to signals from various sensors to control functions the vehicle 10 or vehicle subsystems. The controller 36 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 36 in controlling the vehicle 10 or vehicle subsystems.

Control logic or functions performed by the controller 36 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 36. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

One or more of the clutches 28 within the gearbox 16 may be automatically disengaged when the friction brakes 26 are applied and the vehicle is stationary. This may be referred to as a neutral idle mode or condition of the vehicle 10. Including a neutral idle mode improves vehicle emissions and fuel economy by decoupling rotating elements (e.g., gears, driveshafts, drive wheels) from the powertrain by disengaging one or more of the clutches 28 within the gearbox 16 when the vehicle 10 is stationary. The disengaged one or more clutches 28 may then be configured to re-engage during a launch (i.e., an initial movement from a stationary position.) of the vehicle 10 to transfer to power and/or torque from the input of the gearbox 16 to the drive wheels 22. During a neutral idle condition, the vehicle 10 will have a zero creep torque (i.e., zero torque at the drive wheels 22). Therefore, the friction brakes 26 must be applied to prevent rollback during a neutral idle condition.

During a launch of the vehicle 10 from a neutral idle condition, it desirable to release the friction brakes at the moment the torque of drive wheels 22 has risen to a sufficient value to prevent rollback of the vehicle 10. Releasing the friction brakes 26 too early during a launch of the vehicle 10 may result in rollback while releasing the friction brakes 26 too late during a launch of the vehicle 10 may result in a delayed response. Therefore, it is desirable to accurately determine the torque of the drive wheels 22 during a launch of the vehicle 10 from a neutral idle condition.

Figure 2:
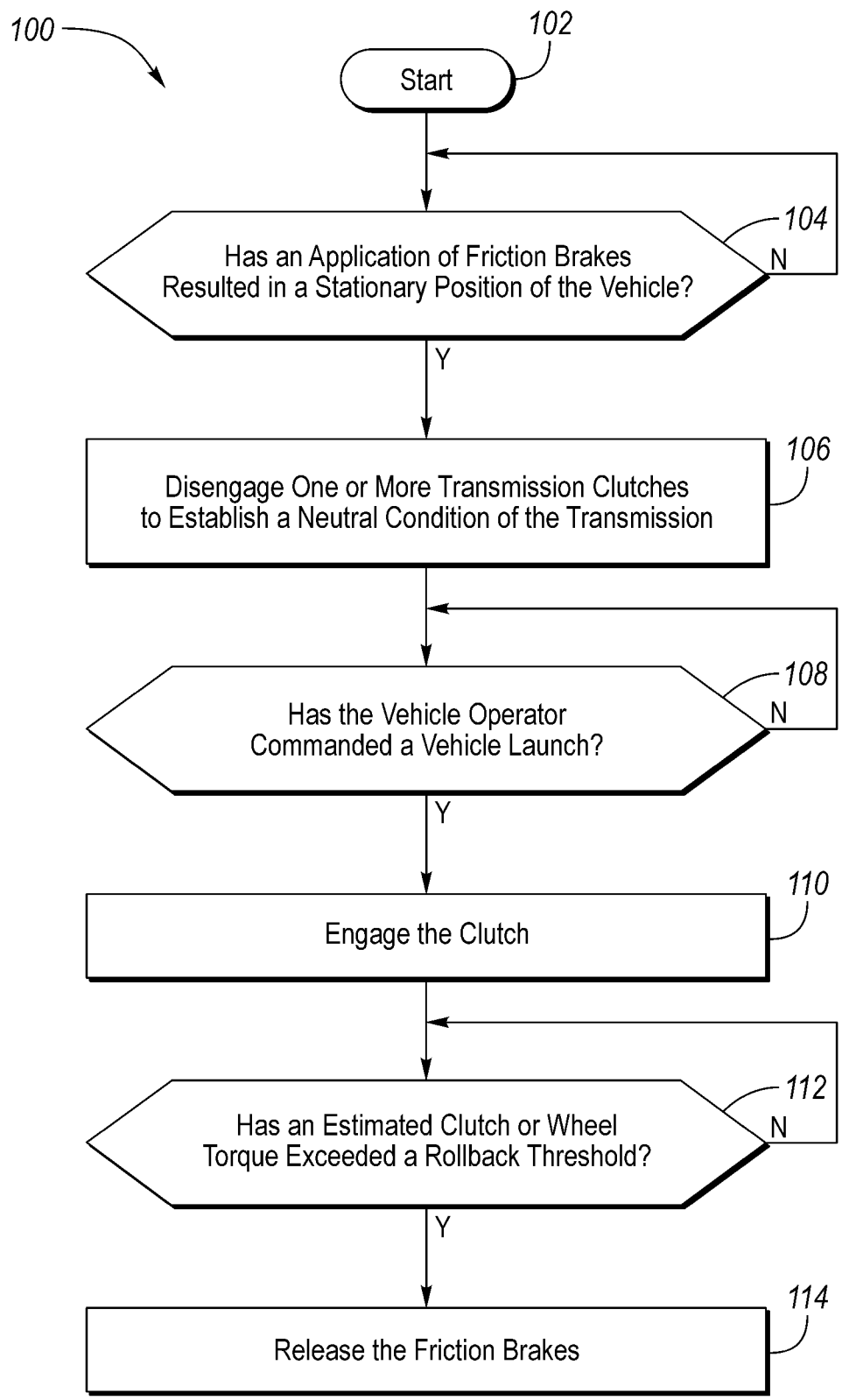
FIG. 2 is a flowchart illustrating a method of controlling the vehicle during a launch.

Referring to FIG. 2, a flowchart depicting a method 100 of controlling the vehicle 10 during a launch is illustrated. The steps of the method 100 may be stored as algorithms and/or control logic within the controller 36. The controller 36 may be configured to implement the method 100 based on various commands, conditions, or states of the vehicle 10 that are communicated to the controller 36. The method 100 is initiated it start block 102. Next, method 100 moves on to block 104 where it is determined if an application of the friction brakes 26 has resulted in a stationary position of the vehicle 10. The stationary position of the vehicle 10 may correspond to a neutral idle condition of the vehicle 10. If an application of the friction brakes 26 has not resulted in a stationary position of the vehicle 10, the method 100 returns to the beginning of block 104. If an application of the friction brakes 26 has resulted in a stationary position of the vehicle 10, the method 100 moves on to block 106 where one or more transmission clutches (e.g., clutches 28) are disengaged to establish a neutral idle condition of the of the transmission (e.g., gearbox 16). Alternatively, at block 106, if the transmission is an AMT or a DCT type transmission, the input device 18 may a launch clutch and the launch clutch (as opposed to one or more transmission clutches) may be disconnected to establish the neutral idle condition of the of the transmission. The launch clutch may include a separate actuator that is in communication with the controller 36. The actuator may be similar to actuator 30.

Once one or more of the transmission clutches have been disengaged and a neutral idle condition of the of the transmission has been established at block 106, the method 100 moves on to block 108 where it is determined if a vehicle operator has commanded a launch of the vehicle 10 from the neutral idle condition. The launch of the vehicle 10 may be commanded by releasing the brake pedal 24 and/or depressing the accelerator pedal 14. If a launch of the vehicle 10 has not been commanded, the method 100 returns to the beginning of block 108. If a launch of the vehicle 10 has been commanded, the method 100 moves on to block 110 where the one or more transmission clutches (e.g., clutches 28) are engaged to transfer power and/or torque from the input of the transmission (e.g., gearbox 16) to the drive wheels 22.

During the engagement of the one or more transmission clutches at block 110, the method 100 also determines if an estimated torque of an engaging clutch (e.g., clutch 28 or launch clutch in AMT or DCT type transmissions) or if an estimated torque of the drive wheels 22 has exceeded a rollback threshold at block 112. The rollback threshold may be a minimum torque value (of either the engaging clutch 28 or the drive wheels 22) that is sufficient to prevent the vehicle 10 from rolling backwards, which may occur if the vehicle 10 is on an uneven surface, such as a hill. If the estimated torque of the engaging clutch 28 or if the estimated torque of the drive wheels 22 has not exceeded the rollback threshold, the method 100 returns to the beginning of block 112. If the estimated torque of the engaging clutch 28 or if the estimated torque of the drive wheels 22 has exceeded the rollback threshold, the method 100 moves on to block 114 where the friction brakes 26 are released. It should be understood that the flowchart in FIG. 2 is for illustrative purposes only and that the method 100 should not be construed as limited to the flowchart in FIG. 2. Some of the steps of the method 100 may be rearranged while others may be omitted entirely.

During the engagement of the clutch 28 at blocks 110 and 112, the relationship between the estimated torque of an engaging clutch 28 and the torque of the drive wheels 26 may be represented by equation (1):

$$T_{est\ wh} = T_{est\ cl} \cdot R_{wtoc} \quad (1)$$

where $T_{est\ wh}$ is the estimated torque of the drive wheels 26, $T_{est\ cl}$ is the estimated torque of the oncoming clutch 28, and $R_{wtoc}$ is the torque ratio between the drive wheels 28 and the oncoming clutch 28 (which may be in a slipping condition). The torque ratio $R_{wtoc}$ is a fixed value that is dictated by the design of the transmission (e.g., gearbox 16).

The condition required to release the friction brakes 26 at block 112 may be represented by relationship (2) or relationship (3):

$$T_{est\ wh} > T_{wh\ rb\ thres} \quad (2)$$

$$T_{est\ cl} > T_{cl\ rb\ thres} \quad (3)$$

where $T_{wh\ rb\ thres}$ is the rollback threshold torque in the domain of the drive wheels 22 and $T_{cl\ rb\ thres}$ is the rollback threshold in the domain of the oncoming clutch 28.

The rollback threshold torque in the domain of the drive wheels $T_{wh\ rb\ thres}$ may be converted to the rollback threshold in the domain of the oncoming clutch $T_{cl\ rb\ thres}$, or vice versa, by utilizing equation (4):

$$T_{wh\ rb\ thres} = T_{cl\ rb\ thres} \cdot R_{wtoc} \quad (4)$$

The rollback threshold torque in the domain of the drive wheels $T_{wh\ rb\ thres}$ may be adjusted based on a grade or slope of the surface that the vehicle 10 is resting upon. Slope or grade may be detected by a sensor such as an accelerometer. A torque required to compensate for the grade or slope of the surface may be a function of the angle of the grade or slope and the mass of the vehicle 10. More specifically, the torque required to compensate for the grade or slope may increase as the grade or slope of the surface increases. The rollback threshold torque in the domain of the drive wheels $T_{wh\ rb\ thres}$ may therefore be adjusted to compensate for the grade or slope of the surface that the vehicle is resting upon based on equation (5):

$$T_{wh\ rb\ thres} = (T_{cl\ rb\ thres} \cdot R_{wtoc}) + T_{grade} \quad (5)$$

where $T_{grade}$ is torque required to compensate for the grade or slope of the surface the vehicle 10 is resting upon.

Also during the engagement of the clutch 28 at blocks 110 and 112, the estimated torque of the oncoming clutch $T_{est\ cl}$ may be based on a first torque estimate $T_{first\ est\ cl}$ of the oncoming clutch 28, a second torque estimate $T_{second\ est\ cl}$ of the oncoming clutch 28, or a combination of the first and second torque estimates. The first torque estimate $T_{first\ est\ cl}$ of the oncoming clutch 28 may be based on a torque at the input of the transmission (e.g., an input of the gearbox 16) and the acceleration at the input shaft of the transmission (e.g., an acceleration of an input shaft to the transmission). In a vehicle application where the input device 18 is a torque converter and the input to the transmission (i.e., the gearbox 16) is a turbine of the torque converter, the first torque estimate $T_{first\ est\ cl}$ of the oncoming clutch 28 may be determined by utilizing equation (6):

$$I_{turb} \cdot \alpha_{turb} = T_{turb} - \frac{T_{first\ est\ cl}}{R_{tctoc}} \quad (6)$$

where $I_{turb}$ is the inertia of the turbine of the torque converter, $\alpha_{turb}$ is acceleration of the turbine of the torque converter, T turbine is torque of the turbine of the torque converter, and $R_{tctoc}$ is the torque ratio between the turbine of the torque converter (which may be represented by transmission input 34) and the oncoming clutch 28 (which may be in a slipping condition). The acceleration of the turbine $\alpha_{turb}$ and the torque of the turbine $T_{turbine}$ may be measured by the one or more sensors 38. The torque ratio $R_{tctoc}$ is a fixed value that is dictated by the design of the transmission (e.g., gearbox 16).

In a vehicle application where the input device 18 is one or more clutches, such as with an AMT or a DCT type transmission, and the input to the transmission (i.e, gearbox 16) is a crankshaft of the engine 12 (considering that any clutch in the input device 18 is engaged in either a slipping or closed state), the first torque estimate $T_{first\ est\ cl}$ of the oncoming clutch 28 may be determined by utilizing equation (7):

$$I_{eng} \cdot \alpha_{eng} = T_{eng} - T_{first\ est\ cl} \quad (7)$$

where $I_{eng}$ is the inertia of the engine 12, $\alpha_{eng}$ is acceleration of the crankshaft of the engine 12, and $T_{eng}$ is torque of the engine 12. The acceleration of the engine $\alpha_{eng}$ and the torque of the engine $T_{eng}$ may be measured by the one or more sensors 38.

The second torque estimate $T_{second\ est\ cl}$ of the oncoming clutch 28 may be based on a clutch pressure (e.g., the hydraulic pressure acting on a piston that engages/disengages the clutch 28) and may be represented by equation (8):

$$T_{second\ est\ cl} = \text{Gain} \cdot (P_{cmd\ cl} - P_{stroke}) \quad (8)$$

where Gain is the gain of the of the oncoming clutch 28, $P_{cmd\ cl}$ is the commanded pressure to the oncoming clutch 28, and $P_{stroke}$ is the stroke pressure of the oncoming clutch 28. The Gain of the oncoming clutch is a constant value that is based on the characteristics of the specific clutch being engaged. The stoke pressure $P_{stroke}$ is the hydraulic pressure where the oncoming clutch 28 begins to engage. The stoke pressure $P_{stroke}$ may correspond to a pressure value that is required to overcome the force from a mechanism (e.g., a return spring) that biases a clutch engaging mechanism (e.g., a hydraulic piston) in a disengaged position.

The estimated torque of the drive wheels $T_{est\ wh}$ may then be estimated based on the first torque estimate $T_{first\ est\ cl}$ of the oncoming clutch 28, the second torque estimate $T_{second\ est\ cl}$ of the oncoming clutch 28, or a combination of the first and second torque estimates, using equations (6-8) in combination with equation (1) above.

At the beginning of the engagement of the oncoming clutch 28 where the torque values of the oncoming clutch 28 and the drive wheels 22 remain relatively low, the second torque estimate $T_{second\ est\ cl}$ of the oncoming clutch 28 may be less accurate than the first torque estimate $T_{first\ est\ cl}$ of the oncoming clutch 28. As the torque values of the oncoming clutch 28 and the drive wheels 22 increase during the engagement, the second torque estimate $T_{second\ est\ cl}$ of the oncoming clutch 28 increases in accuracy.

Figure 3:
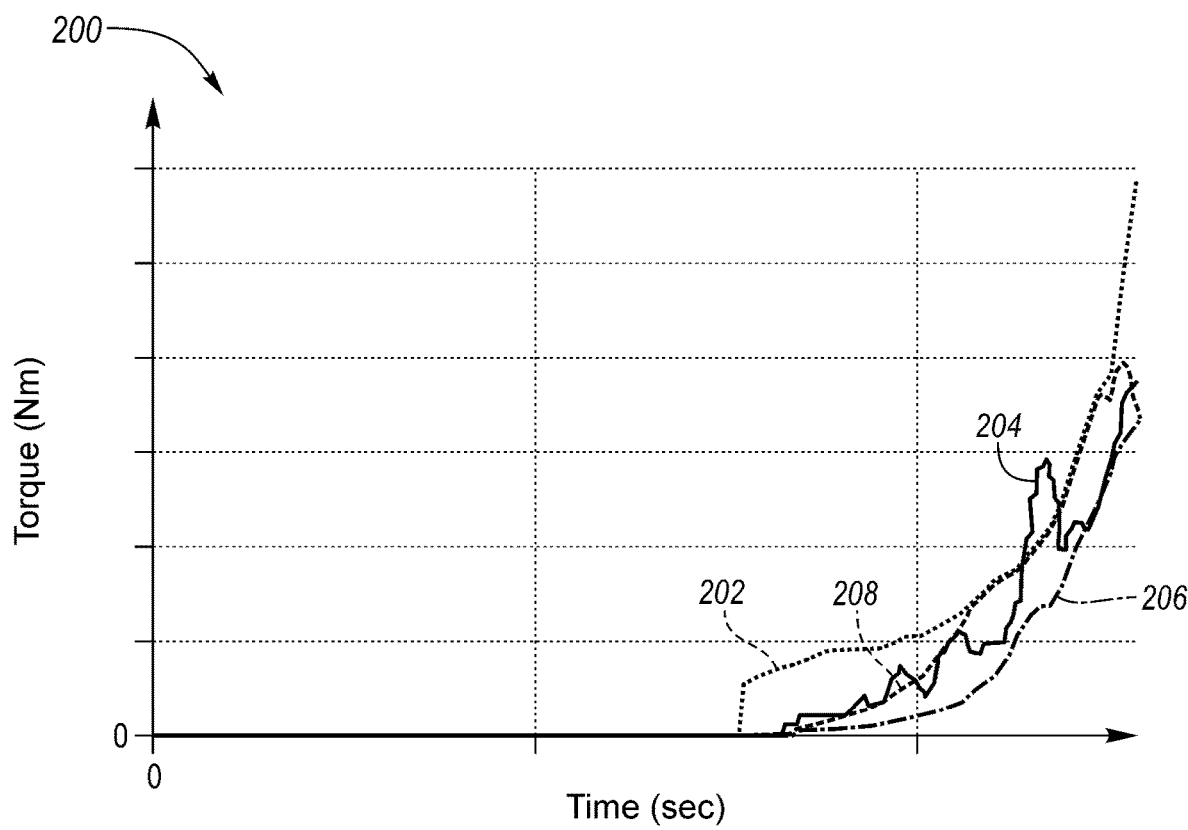
FIG. 3 is graph illustrating an estimated and actual wheel torques during the launch.

More specifically and referring to FIG. 3 (which is a graph 200 illustrating estimated and actual wheel torques during the launch of the vehicle 10 while the oncoming clutch 28 is being engaged), the estimated wheel torque $T_{est\ wh}$ that is based on the second torque estimate $T_{second\ est\ cl}$ of the oncoming clutch 28 (represented by line 202) provides a slight phase lead but may be over-estimated relative to an actual or measured torque of the drive wheels 22 (represented by line 204) at the start of the engagement of the oncoming clutch 28. On the other hand, the estimated wheel torque $T_{est\ wh}$ that is based on the first torque estimate $T_{first\ est\ cl}$ of the oncoming clutch 28 (represented by line 206) is relatively accurate but may have an undesirable lag or time delay relative to the actual or measured torque of the drive wheels 22 (line 204). Line 208 represents an estimated wheel torque $T_{est\ wh}$ that is based on a combination of the first torque estimate $T_{first\ est\ cl}$ and the second torque estimate $T_{second\ est\ cl}$ of the oncoming clutch 28. At the start of the engagement of the oncoming clutch 28, the combined wheel torque estimation 208 is more accurate relative to the actual or measured torque of the drive wheels 22 (line 204) when compared to the estimated wheel torque $T_{est\ wh}$ that is based on the second torque estimate $T_{second\ est\ cl}$ of the oncoming clutch 28 (line 202). The combined wheel torque estimation 208 also has a shorter lag or time delay relative to the actual or measured torque of the drive wheels 22 (line 204) when compared to the estimated wheel torque $T_{est\ wh}$ that is based on first torque estimate $T_{first\ est\ cl}$ of the oncoming clutch 28 (line 206).

The combined wheel torque estimation 208 may be determined by utilizing equation (1) above in conjunction with a total of the estimated torque of the oncoming clutch $T_{est\ cl}$ that is based on a weighted average of the first torque estimate $T_{first\ est\ cl}$ and the second torque estimate $T_{second\ est\ cl}$. The estimated torque of the oncoming clutch $T_{est\ cl}$ that is based on a weighted average of the first torque estimate $T_{first\ est\ cl}$ and the second torque estimate $T_{second\ est\ cl}$ may be represented by equation (9):

$$T_{est\ cl} = K_{fuzzy\ switch} \cdot T_{second\ est\ cl} + (1 - K_{fuzzy\ switch}) \cdot T_{first\ est\ cl} \quad (9)$$

where $K_{fuzzy\ switch}$ is a switching value for a fuzzy switch that adjusts the weight of the first torque estimate $T_{first\ est\ cl}$ and the weight of second torque estimate $T_{second\ est\ cl}$ when determining estimated torque of the oncoming clutch $T_{est\ cl}$ during the engagement of the oncoming clutch 28.

Figure 4:
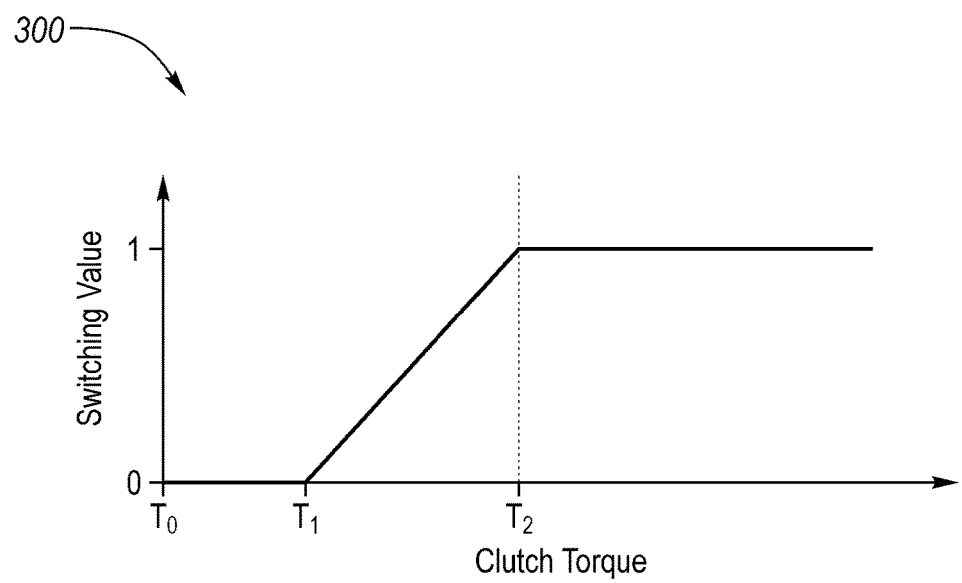
FIG. 4 is a graph illustrating a fuzzy switch.

Referring to FIG. 4, a graph 300 of the fuzzy switch that is utilized for the weighted average calculation according to equation (9) is illustrated. The graph 300 is a plot of the switching value $K_{fuzzy\ switch}$ vs. the estimated torque of the oncoming clutch $T_{est\ cl}$. In a first region between a zero-torque value $T_0$ and a first torque value $T_1$ of the oncoming clutch 28, the switching value $K_{fuzzy\ switch}$ is zero. Therefore, in the first region, the estimated torque of the oncoming clutch $T_{est\ cl}$ will be equal to the first torque estimate $T_{first\ est\ cl}$ and the estimated torque of the drive wheels $T_{est\ wh}$ will be based entirely on the first torque estimate $T_{first\ est\ cl}$.

In a second region between the first torque value $T_1$ and a second torque value $T_2$ of the oncoming clutch 28, the switching value $K_{fuzzy\ switch}$ gradually increases from zero to one. Therefore, in the second region, a portion of the estimated torque of the oncoming clutch $T_{est\ cl}$ that is based on the first torque estimate $T_{first\ est\ cl}$ will decrease as the estimated torque of the oncoming clutch $T_{est\ cl}$ (and the estimated torque of the drive wheels $T_{est\ wh}$) increases. Also in the second region, a portion of the estimated torque of the oncoming clutch $T_{est\ cl}$ that is based on the second torque estimate $T_{second\ est\ cl}$ will increase as the estimated torque of the oncoming clutch $T_{est\ cl}$ (and estimated torque of the drive wheels $T_{est\ wh}$) increases.

In a third region that includes all torque values that range from the second torque value $T_2$ and above, the switching value $K_{fuzzy\ switch}$ is one. Therefore, in the third region, the estimated torque of the oncoming clutch $T_{est\ cl}$ will be equal to the second torque estimate $T_{second\ est\ cl}$ and the estimated torque of the drive wheels $T_{est\ wh}$ will be based entirely on the second torque estimate $T_{second\ est\ cl}$.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a transmission having a clutch configured to transfer torque to a drive wheel;
   friction brakes; and
   a controller programmed to,
      responsive to a command to launch the vehicle, engage the clutch, and
      responsive to an estimated clutch torque exceeding a rollback threshold during the clutch engagement, release the brakes, wherein the estimated clutch torque is based on a clutch pressure and a transmission input torque.

2. The vehicle of claim 1 further comprising a torque converter configured to transfer torque to an input of the transmission, wherein the transmission input torque is a turbine torque of the torque converter.

3. The vehicle of claim 1 further comprising an engine configured to transfer torque to an input of the transmission, wherein the transmission input torque is an engine torque.

4. The vehicle of claim 1, wherein the estimated clutch torque is based on a weighted average of a first estimate and a second estimate, wherein the first estimate is based on the transmission input torque and the second estimate is based on the clutch pressure.

5. The vehicle of claim 4, wherein a portion of the estimated clutch torque that is based on the first estimate decreases as a total estimated clutch torque increases during the clutch engagement.

6. The vehicle of claim 5, wherein a portion of the estimated clutch torque that is based on the second estimate increases as the total estimated clutch torque increases during the clutch engagement.

7. The vehicle of claim 1, wherein the rollback threshold increases as road gradient increases.

8. The vehicle of claim 1, wherein the rollback threshold is based on a minimum wheel torque required to prevent the vehicle from rolling and a torque ratio between the clutch and the drive wheel.

9. A vehicle comprising:
a transmission having a clutch configured to transfer torque from an input of the transmission to a drive wheel;
frictions brakes; and
a controller programmed to,
responsive to application of the friction brakes resulting in a stationary position of the vehicle, disengage the clutch to establish a neutral condition of the transmission,
responsive to a command to launch the vehicle while the transmission is in the neutral condition, engage the clutch, and
responsive to an estimated wheel torque exceeding a rollback threshold during the clutch engagement, release the friction brakes, wherein the wheel torque is based on an estimated clutch torque which is based on a clutch pressure and a transmission input torque.

10. The vehicle of claim 9 further comprising a torque converter configured to transfer torque to an input of the transmission, wherein the input torque to the transmission is a turbine torque of the torque converter.

11. The vehicle of claim 9 further comprising an engine configured to transfer torque to an input of the transmission, wherein the input torque to the transmission is an engine torque.

12. The vehicle of claim 9, wherein the estimated clutch torque is based on a weighted average of a first estimate and a second estimate, wherein the first estimate is based on the input torque to the transmission and the second estimate is based on the clutch pressure.

13. The vehicle of claim 12, wherein the first estimate is also based on an acceleration at the input of the transmission.

14. The vehicle of claim 12, wherein a portion of the estimated clutch torque that is based on the second estimate increases as a total estimated clutch torque increases during the clutch engagement.

15. The vehicle of claim 14, wherein a portion of the estimated clutch torque that is based on the first estimate decreases as the total estimated clutch torque increases during the clutch engagement.

16. A method comprising:
engaging a clutch to transfer torque from a vehicle transmission input to a vehicle drive wheel in response to a vehicle launch command; and
releasing vehicle friction brakes in response to wheel torque exceeding a rollback threshold during the clutch engagement, wherein the wheel torque is based on an estimated clutch torque which is based on a clutch pressure and a transmission input torque.

17. The method of claim 16, wherein the transmission input torque is a turbine torque of a vehicle torque converter.

18. The method of claim 16, wherein the transmission input torque is an engine torque of a vehicle engine.

19. The method of claim 16, wherein the estimated clutch torque is based on a weighted average of a first estimate and a second estimate, wherein the first estimate is based on the transmission input torque and the second estimate is based on the clutch pressure.

20. The method of claim 19 further comprising decreasing a portion of the estimated clutch torque that is based on the first estimate as a total estimated clutch torque increases during the clutch engagement.

* * * * *